United States Patent
Van Geel et al.

(10) Patent No.: US 11,001,663 B2
(45) Date of Patent: May 11, 2021

(54) AQUEOUS DISPERSION AND USES THEREOF

(71) Applicant: DSM IP Assets B.V., Heerlen (NL)

(72) Inventors: Adrianus Antonius Johannes Van Geel, Echt (NL); Franciscus Adrianus Johannes Suykerbuyk, Echt (NL); Gerardus Cornelis Overbeek, Echt (NL); Jurgen Scheerder, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/304,192

(22) PCT Filed: Oct. 17, 2017

(86) PCT No.: PCT/EP2017/076452
§ 371 (c)(1),
(2) Date: Nov. 23, 2018

(87) PCT Pub. No.: WO2018/073234
PCT Pub. Date: Apr. 26, 2018

(65) Prior Publication Data
US 2020/0317842 A1    Oct. 8, 2020

(30) Foreign Application Priority Data
Oct. 17, 2016 (EP) .................... 16194246

(51) Int. Cl.
| | | |
|---|---|---|
| *C08F 265/06* | (2006.01) | |
| *C09D 7/42* | (2018.01) | |
| *C08L 33/08* | (2006.01) | |
| *C09D 133/08* | (2006.01) | |
| *C09D 133/12* | (2006.01) | |
| *C09D 175/04* | (2006.01) | |
| *C08L 33/12* | (2006.01) | |

(52) U.S. Cl.
CPC .......... *C08F 265/06* (2013.01); *C08L 33/08* (2013.01); *C08L 33/12* (2013.01); *C09D 7/42* (2018.01); *C09D 133/08* (2013.01); *C09D 133/12* (2013.01); *C09D 175/04* (2013.01); *C08F 2500/24* (2013.01); *C08L 2201/54* (2013.01)

(58) Field of Classification Search
CPC .... C08F 265/06; C08F 2500/24; C08L 33/08; C08L 33/12; C08L 2201/54; C09D 133/12; C09D 133/08; C09D 7/42; C09D 175/04
USPC ........................................... 524/315
See application file for complete search history.

(56) References Cited

U.S. PATENT DOCUMENTS

| | | | |
|---|---|---|---|
| 2014/0024742 A1* | 1/2014 | Kan .................... | C09D 167/08 523/402 |
| 2014/0034742 A1* | 2/2014 | Meinen ................. | F24D 3/087 237/8 A |

FOREIGN PATENT DOCUMENTS

| | | | | |
|---|---|---|---|---|
| EP | 0 911 375 | 4/1999 | | |
| JP | 5-255634 | 10/1993 | | |
| JP | 05255634 A | * 10/1993 | | |
| JP | 05255634 A1 | * 10/1993 | ........... | C09D 133/06 |
| JP | 5266658 | 5/2013 | | |
| WO | 2005/121595 | 12/2005 | | |
| WO | WO-2005121595 A2 | * 12/2005 | ........... | C08F 265/02 |
| WO | 2008/029454 | 2/2008 | | |
| WO | 2014/187692 | 11/2014 | | |
| WO | WO-2014187692 A1 | * 11/2014 | ........... | C08F 265/06 |

OTHER PUBLICATIONS

International Search Report for PCT/EP2017/076452 dated Dec. 6, 2017, 3 pages.
Written Opinion of the ISA for PCT/EP2017/076452 dated Dec. 6, 2017, 5 pages.

* cited by examiner

*Primary Examiner* — Michael Bernshteyn
(74) *Attorney, Agent, or Firm* — Nixon & Vanderhye P.C.

(57) ABSTRACT

The present invention relates to an aqueous dispersion comprising dispersed particles of an acrylic copolymer having a volume average particle size diameter (d50) of from 1 to 50 μm (microns), wherein the aqueous dispersion further comprises (i) an acrylic copolymer dispersant having an alkaline solubility higher than 50 wt. %, and being present in the dispersion in an amount of from 10 to 35% by weight, relative to the total amount of monomers used to prepare the acrylic copolymer of the dispersed polymeric particles; and (ii) decomposition products of an oil-soluble organic initiator.

26 Claims, No Drawings

AQUEOUS DISPERSION AND USES THEREOF

This application is the U.S. national phase of International Application No. PCT/EP2017/076452 filed Oct. 17, 2017 which designated the U.S. and claims priority to EP Patent Application No. 16194246.1 filed Oct. 17, 2016, the entire contents of each of which are hereby incorporated by reference.

The present invention relates to the field of coating compositions such as paints and inks. It especially relates to compositions which produce coatings that have a high matt (i.e. low gloss) finish and optionally which also have good tactile properties.

Coating compositions with a matt finish are desired for aesthetic and other reasons. The most common method to reduce the gloss of a coating is to add matting agents such as powders and liquid polyethylene waxes.

However generally it has been found that such additives can only be added in very low amounts typically up to a maximum of 5% by total weight of the composition in order to not have significant adverse effects on other properties of the coating. Adding matting agents in an amount a lot less than 5% w/w can still reduce the performance of the coating.

There are also other disadvantages in using matting agents especially when in powder form. Matting powders are first ground into a pigment paste before being added to a coating composition and this is labour and energy intensive. Matting powders have a large surface area and contain a large proportion of dust-forming small particles that may create exposure and explosion hazards. To obtain a matt finish the viscosity of the composition must be repeatedly adjusted as the pigment paste is added and this further step is also labour intensive. The large surface area makes the matting powder difficult to disperse homogenously and there is a tendency for the matting powder to migrate to the coating surface after application. If the coating is damaged or abraded, this can remove matting powder increasing surface gloss.

Similar problems exist when using liquid wax matting agents which also tend to migrate to the coating surface. Typical liquid wax matting agents are hydrophobic. This creates a further problem of making the coating less compatible with other ingredients especially where the wax migrates to the surface. This makes subsequent recoating more difficult.

Also coatings with special tactile properties are more and more desired. Tactile impression and touching is a subconscious process that is regarded very important in the perception of materials. The industry wants their product to stand out and get noticed and packaging surfaces with differentiating tactile properties such as for instance velvet, rubbery, powdery, or suede are in high demand. For example, a surface with a soft-tactile finish is intended to provide a soft, warm touch sensation and also to give a sense of premium quality to the object. Luxurious and sophisticated are words often used to describe the effect a tactile coating can produce.

The object of the present invention is to provide an aqueous dispersion of acrylic copolymer particles which aqueous dispersion can be used as matting agent (and optional also as tactile modifier) or as latex in aqueous coating compositions to provide a coating with low gloss and optional also with tactile properties.

The object has surprisingly been achieved by providing an aqueous dispersion comprising dispersed polymeric particles of an acrylic copolymer having a volume average particle size diameter (d50) of from 1 to 50 µm (microns), wherein the aqueous dispersion further comprises (i) an acrylic copolymer dispersant having an alkaline solubility preferably higher than 50 wt. %, and being present in the dispersion in an amount of preferably from 10 to 35% by weight, relative to the total amount of monomers used to prepare the acrylic copolymer of the dispersed polymeric particles; and (ii) decomposition products of an oil-soluble organic initiator.

The object has surprisingly been achieved by providing aqueous dispersions of certain acrylic copolymer particles prepared by free radical suspension polymerisation and selection of appropriate combinations of kind of stabilizer and stabilizer concentration. Such dispersions can be used as latex for preparing matt coatings or can be used as matting agent for preparing matt coatings, and thus they can be used instead of the conventional matting agents or they can partly replace the conventional matting agents. Applying an aqueous dispersion as or for aqueous coating compositions to obtain low gloss coatings compared to applying dry particles is advantageous since dispersed particles are more easily to disperse homogeneously than dry particles. Furthermore, the aqueous dispersions according to the present invention as well as the aqueous coating composition containing the aqueous dispersions according to the present invention are advantageously storage stable to semi-storage stable for at least one week under standard conditions, thus there is no need to remove water from the aqueous dispersions for storage purposes and the aqueous dispersion of the present invention can also be mixed with aqueous dispersions of latex polymers without additional handling steps. Storage stability shifts from stable to semi-stable with increasing particle size in which semi-stable refers to a situation where larger particles are no longer uniformly dispersed and gentle shaking or mixing is required to obtain optimum dispersion again.

Typically a suspension polymer has a particle size higher than 50 microns up to 1500 microns and is dried to free flowing particle product because the suspension slurry is not storage stable because of the high particle size. The applicant has developed a suspension polymerisation process that surprisingly results in aqueous dispersions with long storage stability containing dispersed polymer particles of small particle size (i.e. having a volume average particle size diameter (d50) of from 1 to 50 µm (microns), preferably from 1 to 40 µm, more preferably from 1 to 30 µm), which can produce coatings with good matt and optionally good tactile properties. Such water borne dispersion are very different from conventional products for matt finishes from companies such as Lucite, Arkema and Microbeads as these prior art products are typically prepared as dry beads. Particles obtained according to the invention have very different properties compared to dry beads matting additives as described above, in particular with respect to handing of the matting additive and homogeneity of the matting additive in the liquid coating composition. Further, the permitted $T_g$ of dry beads is limited as dry beads having a $T_g$ less than about 30 to 40° C. are no longer storage stable (i.e. not free flowing anymore due to fusing of the beads). Dry beads are in general prepared by first preparing an aqueous dispersion of polymer particles by suspension polymerization and then taking off the water from the aqueous dispersion to obtain dry beads. Aqueous dispersions of polymer particles prepared by suspension polymerization can be prepared from polymers having a wide range of $T_g$ (glass transition temperature) values, but when $T_g$ is too low the particles agglomerate as soon as you take off the water. As such, the permitted $T_g$ of dry beads is limited as dry beads having a $T_g$ less than about 30 to 40° C. are no longer storage stable.

It has surprisingly been found that selection of appropriate combinations of kind of stabilizer and stabilizer concentration and kind of initiator can allow a suspension polymerization to produce (semi-)storage stable aqueous dispersions having particles having volume average particle size diameter (d50) from 1 micron to 50 microns, preferably from 1 micron to 40 microns, more preferably from 1 to 30 microns. These low average particle sizes can even be obtained when using normal shear as applied in the experimental part of the present application.

Surprisingly the applicant has found that the aqueous dispersion of the present invention are (semi-)storage stable and can very suitably be used as matting agent for aqueous coating compositions (in particular when containing acrylic and/or urethane latex polymers) or as latex for aqueous coating compositions to provide a coating with low gloss and further the aqueous dispersions of the present invention are able to influence the tactile property of the coating obtained with a coating composition comprising the aqueous dispersion of the present invention. As is known in the art, a latex is a dispersion of polymeric particles, the polymeric particles act as binder when coating the dispersion on a substrate. An additional advantage is that other relevant coating properties (i.e. water resistance, chemical resistance like oil and ethanol resistance and/or adhesion to substrate) are not significantly adversely affected or at least remain on a level required for coating applications.

As used herein, a storage stable dispersion means a dispersion that is storage stable under standard conditions for at least one week, preferably at least two weeks, more preferably at least 3 weeks and even more preferably at least four weeks. Storage stable for at least one week means that after the dispersion has been stored under standard conditions for one week no discernible sediment is observed without having to add additives improving the storage stability such as associative thickeners. In case sediment is detected by visual inspection of the aqueous dispersion, the aqueous dispersion is considered to be not storage stable.

As used herein, a semi-storage stable dispersion means a dispersion that is semi-storage stable under standard conditions for at least one week, preferably at least two weeks, more preferably at least 3 weeks and even more preferably at least four weeks. Semi-storage stable for at least one week means that after the dispersion has been stored under standard conditions for one week gentle shaking or mixing is required to obtain optimum dispersion again. External thickener might be used to obtain a longer-term storage stable dispersion As used herein, unless the context indicates otherwise, standard conditions means a relative humidity of 70%±5%, ambient temperature (23° C.).±2°, atmospheric pressure and an air flow of (less than or equal to) 0.1 m/s.

The term acrylic copolymer as used herein denotes a polymer obtained by polymerisation of at least one polymer precursor which comprises an acrylic (—HC═CHC(═O)O—) and/or a methacrylic (—HC═C(CH$_3$)C(═O)O—) moiety. The amount of methacrylic and acrylic moieties in the acrylic copolymer is preferably at least 50 wt. % relative to the acrylic copolymer. A (meth) acrylic moiety is a moiety with polymerisible olefinic (C═C) double bond(s). The acrylic polymer may comprise other moieties including arylalkylenes such as styrene. Preferably ethylene, propylene, butylene and isoprene are not used as acrylic copolymer precursor.

The acrylic copolymer dispersant is used in the present invention to prepare a dispersion of acrylic copolymer particles having a volume average particle size diameter (d50) of from 1 to 50 μm (microns), preferably from 1 to 40 μm, more preferably from 1 to 30 μm which dispersion is storage stable to semi-storage stable under standard conditions for at least one week, preferably at least two weeks, more preferably at least 3 weeks and even more preferably at least four weeks. More preferably, the acrylic copolymer dispersant is used in the present invention to prepare a dispersion of acrylic copolymer particles having a volume average particle size diameter (d50) of from 1 to 20 μm, which dispersion is storage stable under standard conditions for at least one week, preferably at least two weeks, more preferably at least 3 weeks and even more preferably at least four weeks. The volume average particle size diameter d50 is defined as the particle size for which 50 percent by volume of the particles has a size lower than the d50. In the present invention, the acrylic copolymer dispersant is also referred to as the first phase acrylic copolymer.

The amount of solid acrylic copolymer dispersant in the aqueous dispersion according to the invention is preferably from 10 to 35% by weight, more preferably at least 15% by weight, more preferably at least 20% by weight, relative to the total amount of monomers used to prepare the acrylic copolymer(s) of the dispersed polymeric particles.

The acrylic copolymer dispersant has an alkaline solubility higher than 50 wt. %, preferably higher than 60 wt. %, more preferably higher than 65 wt. % and even more preferably higher than 70 wt. %. The acrylic copolymer dispersant preferably has an alkaline solubility of at most 100 wt. %, more preferably of at most 95 wt. % and most preferably of at most 90 wt. %.

As used herein, the alkaline solubility is determined as follows: A dispersant solution of approximately 12.5 wt. % solids is prepared and subsequently neutralized by using 1.10 stoichiometric amount of ammonia at 80° C. After cooling down to room temperature, the pH is checked and if needed corrected to a pH of 8.5 to 9. Subsequently, the solid content of the neutralized solution is lowered to approximately 3 wt. % and the solid content is determined by gravimetric method at 105° C. and 150° C. for 1 hr each (see below—solids determination). Subsequently the solution is transferred to an ultracentrifuge Sigma 3-30K with a 12158-H rotor and 6×20 mL vials and centrifuged for 24 hours at 25000 rpm (corresponding to 50000 gravity). Next the solid content of the supernatant (top layer of vial) is determined by gravimetric method at 105° C. and 150° C. for 1 hr each (see below-solids determination) and the percentage of dissolved polymer is calculated by dividing supernatant solids by initial alkaline solution solids.

Calculation=(Supernatant solids/Original(±3%)solids)×100%=% Alkaline solubility

Solids Determination

Weigh empty aluminum dish (A). Weigh out about 1 g of sample to 4 decimal places (B); carry out the determination in triplicate. Transfer the dishes to the oven for 1 hour at 105° C. followed by 1 hour at 150° C. Take the dishes out of the oven and let them cool down for 5 minutes. Subsequently, weigh the dishes (C).

Calculation:

$((C-A)/(B-A))\times 100\%$=wt. % solids

A=weight of empty aluminum dish
B=weight of empty aluminum dish+sample (before drying)
C=weight of empty aluminum dish+sample (after drying)

The acrylic copolymer dispersant preferably has a volume average particle size (d50) of less than 150 nm.

Preferably, the acrylic copolymer dispersant prepared in a first phase polymerisation, preferably emulsion polymerisation, is (partially) neutralized by reacting the acrylic copolymer containing carboxylic acid groups and/or carboxylate salt groups with a base, preferably in a stoichiometric amount of from 0.4 to 2.0, more preferably in a stoichiometric amount of from 0.5 to 1.5, more preferably in a stoichiometric amount of from 0.75 to 1.25, more preferably in a stoichiometric amount of from 0.8 to 1.2, even more preferably in a stoichiometric amount of from 0.9 to 1.1. Accordingly, the neutralisation degree of the acrylic copolymer dispersant is preferably in the range from 40 to 200% of the stoichiometric amount, more preferably in the range from 50 to 150% of the stoichiometric amount, more preferably in the range from 75 to 125% of the stoichiometric amount, more preferably in the range from 80 to 120% of the stoichiometric amount and even more preferably in the range from 90 to 110% of the stoichiometric amount. The base that is used to neutralize the acrylic copolymer dispersant can be an organic or inorganic base, examples of which include organic amines such as trialkylamines (e.g. triethylamine, tributylamine), morpholine and alkanolamines such as dimethyl ethanol amine, and inorganic bases such as ammonia, NaOH, KOH, and LiOH. Preferably, the base is selected from the group consisting of ammonia, dimethyl ethanol amine or a mixture thereof. Most preferably the base is ammonia.

Preferably, the dispersion of the acrylic copolymer dispersant prepared in a first phase polymerisation, preferably emulsion polymerisation, has an acid value of at least 40 mg KOH/g dispersion of the acrylic copolymer dispersant. More preferably, the dispersion of the acrylic copolymer dispersant has an acid value of at least 50 mg KOH/g dispersion of the acrylic copolymer dispersant, more preferably at least 60 mg KOH/g dispersion of the acrylic copolymer dispersant. The acid value of the dispersion of the acrylic copolymer dispersant is preferably at most 100 mg KOH/g dispersion of the acrylic copolymer dispersant, more preferably at most 80 mg KOH/g dispersion of the acrylic copolymer dispersant. As used herein, the acid value is determined according to ASTM D1639-90.

The acrylic copolymer dispersant prepared in a first phase polymerisation, preferably emulsion polymerisation, preferably has a weight average molecular weight of at least 30 kDaltons, more preferably of at least 40 kDaltons, more preferably at least 50 kDaltons, more preferably at least 100 kDaltons, even more preferably at least 150 kDaltons. The weight average molecular weight of the acrylic copolymer dispersant is preferably at most 1000 kDaltons, more preferably at most 750 kDaltons, even more preferably at most 500 kDaltons, even more preferably at most 400 kDaltons, even more preferably at most 300 kDaltons and most preferably at most 250 kDaltons. As used herein, the weight average molecular weight $M_w$ is determined by Size Exclusion Chromatography (SEC) using a method which is a modification of ISO/FDIS 13885-1 and DIN 55672:

Weigh-in approximately 32 mg sample (re-calculated to 100% solids) into a 10 ml culture tube with screw cap and PTFE inlay. Add approximately 8 ml Tetrahydrofuran (THF), 99.8%, stabilised with Bis Hydroxy Toluene (250 mg per liter) and mix regularly until completely dissolved. Accordingly, 1 µL is injected on a SEC apparatus consisting of eluent reservoir, degasser, pump delivering a pulse free reproducible and constant flow (Flow rate 1.0 mL/min+/− 0.1%), injection system with no memory effects (Reproducibility 1% or better, carry over less than 0.1%), column(s) (1×PLgel 5 µm Guard 50×7.5 mm+3×PLgel 5 µm Mixed-C 300×7.5 mm), differential refractometer (cell volume <10 µl) and data station with GPC software. Molecular weight is calculated from the resulting chromatogram using polystyrene Mp 160-10,000,000 Daltons (polymer standard service (PSS) DIN certified) standards.

The acrylic copolymer dispersant prepared in a first phase polymerisation, preferably emulsion polymerisation, preferably has a glass transition temperature from −50° C. to 150° C.

As used herein, the glass transition temperature is determined using Differential Scanning calorimetry according to ISO Standard 1357. Thermal characteristics of the samples were investigated under a nitrogen atmosphere using a Q2000 DSC from TA Instruments. The DSC sample is prepared by sealing approximately 5 mg sample in a standard aluminum pan. Indium was used for the enthalpy and temperature calibration of the instrument and an empty pan was used as the reference. The thermal transitions of the samples were investigated with the temperature program described in the Table below. The first heating to 160° C. erased the thermal history of the samples and reported thermal characteristics were obtained from the second heating curve.

DSC Temperature Program

| Start temperature (° C.) | End temperature (° C.) | Temperature ramp (° C./min) | Isothermal period (min) |
|---|---|---|---|
| 40 | −85 | 20 | 10 |
| −85 | 160 | 10 | 5 |
| 160 | −85 | 20 | 10 |
| −85 | 160 | 10 | — |

The acrylic copolymer dispersant prepared in a first phase polymerisation is obtained by free radical polymerisation, preferably emulsion polymerisation, of a monomer composition that comprises A) at least one carboxylic acid functional olefinically unsaturated monomer, preferably (meth)acrylic acid, more preferably methacrylic acid; and B) at least one monomer containing at least one acrylic or methacrylic moiety and being different than monomer A); and C) optionally olefinically unsaturated monomers other than A) and B).

The carboxylic acid functional olefinically unsaturated monomer A) is preferably selected from the group consisting of acrylic acid, methacrylic acid, and R-carboxyethyl acrylate, citraconic acid, crotonic acid, fumaric acid, itaconic acid, itaconic anhydride, monoalkyl ester of itaconic acid such as for example monomethyl itaconate, maleic acid, maleic anhydride, and combinations thereof; more preferably the carboxylic acid functional olefinically unsaturated monomer is acrylic acid, methacrylic acid, itaconic acid, fumaric acid and mixtures thereof. More preferred carboxylic acid functional olefinically unsaturated monomer A) is methacrylic acid and/or acrylic acid. Most preferred carboxylic acid functional olefinically unsaturated monomer A) is methacrylic acid.

Suitable monomers containing at least one acrylic or methacrylic moiety are $C_{1-20}$ hydrocarbyl (meth)acrylates, optionally combined with (meth)acrylates containing functional groups for imparting crosslinkablilty when the aqueous binder composition is subsequently dried. Conveniently $C_{1-20}$hydrocarbyl (meth)acrylates are $C_{1-12}$alkyl (meth)acrylates, most conveniently $C_{1-10}$alkyl (meth)acrylates, for example $C_{1-8}$alkyl (meth)acrylates.

The free-radical polymerization to obtain the acrylic copolymer dispersant is conducted using a free radical initiator, appropriate heating and agitation (stirring). The polymerisation is preferably emulsion polymerisation employing water-soluble free radical initiators [e.g. hydrogen peroxide, t-butyl-hydroperoxide, cumene hydroperoxide, persulphates such as ammonium, K and Na salts of persulphate; redox systems may be used; combinations such as t-butyl hydroperoxide isoascorbic acid and FeEDTA are useful]; the amount of initiator, or initiator system, is generally 0.05 to 3% based on the weight of total monomers charged. The molecular weight of the acrylic copolymer dispersant can be controlled by the use of well-known chain transfer agents. Preferred chain transfer agents can include mercaptanes and alkyl halogenides. More preferred, the chain transfer agent is selected from the group of lauryl mercaptane, 3-mercapto propionic acid, i-octyl thioglycolate, mercaptoethanol, tetrabromo methane, or tribromo methane. Most preferably the chain transfer agent is a mercaptane, selected from the group of lauryl mercaptane, 3-mercapto propionic acid, i-octyl thioglycolate, and mercaptoethanol.

The aqueous dispersion of the present invention preferably comprises less than 2 wt. %, more preferably less than 1 wt. %, even more preferably 0 wt. %, relative to the total amount of monomers used to prepare the acrylic copolymer(s) of the dispersed polymeric particles, of (partially) hydrolysed vinyl acetate (co)polymer.

The dispersed acrylic copolymeric particles present in the waterborne dispersions of the invention are prepared by a free radical polymerization process in the presence of an oil-soluble organic initiator (also referred herein as suspension polymerization process) in a one-step or multi-step suspension polymerization process. More preferably a one-step suspension polymerization process is applied in which all the monomers to prepare the dispersed acrylic copolymer particles are present at the start of the suspension polymerization process and a single phase acrylic copolymer is obtained. The suspension polymerisation is preferably effected at a temperature of from 10 to 95° C., more preferably from 25 to 95° C.

Accordingly, the aqueous dispersion of the present invention comprises dispersed particles of acrylic copolymer having a volume average particle size diameter (d50) of from 1 to 50 μm (microns), preferably from 1 to 40 μm, more preferably from 1 to 30 μm; and an acrylic copolymer dispersant having an alkaline solubility preferably higher than 50 wt. % in an amount of preferably from 10% to 35% by weight, relative to the total amount of monomers used to prepare the acrylic copolymer(s) of the dispersed polymeric particles; wherein the dispersed particles are obtained by free radical polymerisation of ethylenically unsaturated monomers (at least a part of the ethylenically unsaturated monomers contains (meth)acrylic moiety) in the presence of an oil-soluble organic initiator and the acrylic copolymer dispersant. The dispersed particles of acrylic copolymer having a volume average particle size diameter (d50) of from 1 to 50 μm (preferably from 1 to 40 μm, more preferably from 1 to 30 μm), preferably have an alkaline solubility lower than the alkaline solubility of the acrylic copolymer dispersant. More preferably the alkaline solubility of the dispersed particles of acrylic copolymer having a volume average particle size diameter (d50) of from 1 to 50 μm (preferably from 1 to 40 μm, more preferably from 1 to 30 μm) is lower than 20 wt. %, more preferably lower than 10 wt. % and more preferably the alkaline solubility is lower than 5 wt. %.

The aqueous dispersion of the invention as well as the process to prepare the aqueous dispersion of the invention can be and is preferably free of non-aqueous solvent (i.e. organic solvent). While free of usually means entirely free of, it will be appreciated that from a practically point of view it may sometimes be difficult to exclude very small amounts of non-aqueous solvent, which would have no material effect on the process or composition, as e.g. when incorporating a small amount of commercially obtained additive which might contain very small amounts of non-aqueous solvent.

The glass transition temperature $T_g$ of the acrylic copolymer of the dispersed particles is preferably higher than −65° C. and lower than 150° C., preferably at least −50° C. and preferably lower than 135° C. and even more preferably lower than 125° C., whereby the glass transition temperature is measured as described herein.

The dispersed acrylic copolymer particles present in the aqueous dispersion of the present invention (and obtained with the process of the present invention) has a volume average particle size diameter (d50) of from 1 to 50 μm (microns), preferably from 1 to 40 μm, more preferably from 1 to 30 μm. Volume average particle size diameter (d50) and particle size distribution (defined as (d90-d10)/d50) are analyzed using laser diffraction with Malvern Mastersizer 3000 Particle Size Analyzer as described in ISO Standard 13320 (2009) equipped with a hydro LV sampler and demineralized water as dispersant (Refractive Index=1.33). Material settings: a refractive index of 1.35, an absorption index of 0.60 and a density of 1 g/cm3. Sample is measured 3 times using continuous ultrasonic (setting at 50%) having a measurement loop of 30 sec using red light (630 nm) and 30 sec using blue light (470 nm). Average result will be reported as volume average particle size d50, d10 and d90. d10 is defined as the particle size for which 10 percent by volume of the particles has a size lower than the d10. d90 is defined as the particle size for which 90 percent by volume of the particles has a size lower than the d90.

The particle size distribution of the dispersed acrylic copolymer particles is preferably at most 10, whereby the particle size distribution is measured as described herein. Preferably, the dispersed acrylic copolymer particles useful for preparing optimum matt compositions have a volume average particle size diameter (d50) of from 2 to 25 μm, more preferably from 5 to 20 μm and even more preferably from 10 to 15 μm.

Preferably, for preparing matt compositions with the aqueous dispersion according to the invention, the glass transition temperature $T_g$ of the acrylic polymer present in the aqueous dispersion according to the invention is at least 50° C., more preferably at least 60° C., more preferably at least 75° C. and preferably lower than 150° C., more preferably lower than 135° C. and even more preferably lower than 125° C., whereby the glass transition temperature is measured as described herein.

The dispersion of dispersed acrylic copolymer particles of the present invention is also useful for preparing compositions having improved tactile properties. Preferably, the particle size distribution ((d90-d10)/d50) of the dispersed acrylic copolymer particles useful for preparing compositions having improved tactile properties is at most 3. Preferably, for preparing compositions having tactile properties with the aqueous dispersion according to the invention, the glass transition temperature $T_g$ of the acrylic copolymer present in the aqueous dispersion according to the invention is at most 50° C., preferably at most 0° C., more preferably at most −20° C. and preferably higher than −65° C., more preferably higher than −60° C., whereby the glass transition temperature is measured as described herein.

Preferably, the density of the dispersed acrylic copolymeric particles is in the range from 0.95 to 1.10 g/ml, in particular when the glass transition temperature $T_g$ of the acrylic copolymer present in the aqueous dispersion according to the invention is at most 50° C., preferably at most 0° C., more preferably at most −20° C. and preferably higher than −65° C., more preferably higher than −60° C. It has surprisingly been found that, in particular for such low $T_g$ acrylic copolymers, the density of the dispersed acrylic copolymer particles in the aqueous dispersion has a substantial effect on the storage stability of the aqueous dispersion. In particular, with a density of dispersed low $T_g$ acrylic copolymeric particles in the range from 0.95 to 1.10 g/ml, a superior storage stability of the aqueous dispersion comprising the dispersed low $T_g$ acrylic copolymeric particles can be obtained. The density of a copolymer having "n" copolymerised comonomers is given by the weight fractions W of each comonomer type and the density of the homopolymers derived from each comonomer (see CROW Polymer Property Database "Average density of amorphous polymers") according to the equation:

$$\text{Density of copolymer} = (W_1 \times \text{density}_1) + (W_2 \times \text{density}_2) + \ldots + (W_n \times \text{density}_n).$$

The acrylic copolymer of the acrylic copolymer dispersed particles preferably comprises
a) from 0 to 10 wt. % of potentially ionic ethylenically mono-unsaturated monomers;
b) from 0 to 10 wt. % of non-ionic ethylenically unsaturated monomers with a functional group for crosslinking;
c) from 60 to 100 wt. % of non-ionic ethylenically mono-unsaturated monomers other than b);
d) from 0 to 20 wt % of non-ionic ethylenically polyunsaturated monomer other than b);
wherein the sum of a) to d) is 100 wt. % and the amounts of a) to d) is given relative to the total weight amount of the monomers to prepare the acrylic copolymer of the dispersed particle (i).

More preferably, the acrylic copolymer of the acrylic copolymer dispersed particles comprises
a) from 0 to 3 wt. % of potentially ionic ethylenically mono-unsaturated monomers;
b) from 0 to 5 wt. % of non-ionic ethylenically unsaturated monomers with a functional group for crosslinking;
c) from 72 to 100 wt. % of non-ionic ethylenically mono-unsaturated monomers other than b);
d) from 0 to 20 wt % of non-ionic ethylenically polyunsaturated monomer other than b);
wherein the sum of a) to d) is 100 wt. % and the amounts of a) to d) is given relative to the total weight amount of the monomers to prepare the acrylic copolymer of the dispersed particle.

Even more preferably, the acrylic copolymer of the acrylic copolymer particles comprises
a) 0 wt. % of potentially ionic ethylenically mono-unsaturated monomers;
b) from 0 to 3 wt. % of non-ionic ethylenically unsaturated monomers with a functional group for crosslinking;
c) from 77 to 100 wt. % of non-ionic ethylenically mono-unsaturated monomers other than b);
d) from 0 to 20 wt % of non-ionic ethylenically polyunsaturated monomer other than b);
wherein the sum of a) to d) is 100 wt. % and the amounts of a) to d) is given relative to the total weight amount of the monomers to prepare the acrylic copolymer of the dispersed particle.

As used herein, potentially ionic monomer means a monomer which under the relevant conditions can be converted into an ionic monomer by neutralization. Potentially ionic ethylenically mono-unsaturated monomers a) advantageously consist essentially of at least one ethylenically unsaturated carboxylic acid. More preferred acids have one ethylenic group and one or two carboxy groups. Most preferably the acid(s) are selected from the group consisting of: acrylic acid (and oligomers thereof), beta carboxy ethyl acrylate, citraconic acid, crotonic acid, fumaric acid, itaconic acid, maleic acid, methacrylic acid and mixtures thereof. Preferred potentially ionic mono-unsaturated ethylenically unsaturated monomers a) are acrylic acid, methacrylic acid and mixtures thereof.

The acrylic copolymer of the dispersed particles may comprise non-ionic ethylenically unsaturated monomers b) with a functional group for crosslinking when the aqueous coating composition is subsequently dried. Preferably the functional groups for imparting crosslinkablilty are selected from the group consisting of: epoxy, carboxylic acid, hydroxyl, ketone and/or silane groups. Monomers b) with functional groups for imparting crosslinkablilty are preferably selected from glycidyl (meth)acrylate, hydroxyalkyl (meth)acrylates such as hydroxyethyl (meth)acrylate, acrolein, methacrolein and methyl vinyl ketone, the acetoacetoxy esters of hydroxyalkyl (meth)acrylates such as acetoacetoxyethyl (meth)acrylate, and keto-containing amides such as diacetone acrylamide. The functional group for providing crosslinkability is most preferably a ketone group. In case the acrylic copolymer comprises monomer(s) b) with functional groups for imparting crosslinkablilty, the coating composition comprising the aqueous dispersion of the present invention is preferably combined with a crosslinking agent (i.e. so that crosslinking takes place e.g. after the formation of a coating therefrom). For example, monomer(s) with hydroxyl functional groups for imparting crosslinkablilty are used in combination with for example a polyisocyanate as crosslinking agent. Monomer(s) with functional groups for imparting crosslinkablilty comprising ketone and/or aldehyde functional groups are used in combination with for example a polyamine or a polyhydrazide as crosslinking agent. An example of a suitable polyamine is isophorone diamine. Examples of suitable polyhydrazides are adipic acid dihydrazide, oxalic acid dihydrazide, phthalic acid dihydrazide and terephthalic acid dihydrazide. A preferred polyhydrazide is adipic acid dihydrazide. A preferred combination of crosslinking agent and functional group for imparting crosslinkablilty when the coating composition is subsequently dried is the combination of adipic acid dihydrazide as crosslinking agent and at least one ketone group present in the monomer b) with functional groups for imparting crosslinkablilty. Diacetone acrylamide (DAAM) is a preferred monomer with ketone functional groups for use in combination with adipic acid dihydrazide.

The acrylic copolymer of the dispersed particles comprises non-ionic ethylenically mono-unsaturated monomers other than b). The non-ionic ethylenically mono-unsaturated monomers c) is preferably not ethylene, propylene, butylene or isoprene. Preferably, the non-ionic ethylenically mono-unsaturated monomers c) are selected from the group consisting of acrylonitrile, acrylates, methacrylates, itaconates, acrylamides, arylalkylenes and any mixture thereof. Preferred arylalkylene monomers comprise (optionally hydrocarbo substituted) styrene and conveniently the optional hydrocarbo may be $C_{1-10}$hydrocarbyl, more conveniently $C_{1-4}$alkyl. Suitable arylalkylene monomers are selected from: styrene, α-methyl styrene, vinyl toluene, t-butyl styrene, di-methyl styrene and/or mixtures thereof, especially styrene. More preferably, the non-ionic ethylenically mono-unsaturated monomers c) are selected from the group consisting of acrylates, methacrylates and any mixture thereof. Preferably the acrylate or methacrylate comprises hydrocarbo (meth)acrylate(s) and conveniently the hydrocarbo moiety may be $C_{1-20}$hydrocarbyl, more conveniently $C_{1-12}$alkyl, most conveniently $C_{1-8}$alkyl. Suitable (meth)acrylate(s) may be selected from: methyl (meth)acrylate, ethyl (meth)acrylate, isooctyl (meth)acrylate, 4-methyl-2-pentyl (meth) acrylate, 2-methylbutyl (meth) acrylate, iso-amyl (meth)acrylate, sec-butyl (meth)acrylate, n-butyl (meth)acrylate, 2-ethylhexyl (meth)acrylate, 2-octyl (meth) acrylate, lauryl (meth)acrylate, isodecyl (meth)acrylate, isobornyl (meth)acrylate, cyclohexyl (meth)acrylate and/or mixtures thereof. The ethylenically unsaturated monomers c) preferably contains one or more $C_{1-8}$ alkyl (meth)acrylates, more preferably the ethylenically unsaturated monomers c) is one or more $C_{1-8}$ alkyl (meth)acrylates. Very suitable examples are methyl (meth)acrylate, ethyl (meth) acrylate, sec-butyl (meth)acrylate and n-butyl (meth)acrylate.

The acrylic copolymer of the dispersed particles may comprise non-ionic ethylenically polyunsaturated monomers d) other than b). Preferred non-ionic ethylenically polyunsaturated monomers d) are allylmethacrylate and/or poly(propyleneglycol) diacrylate, preferably dipropyleneglycol diacrylate. In particular in case the glass transition temperature $T_g$ of the acrylic copolymer of the dispersed particles is at most 50° C., more in particular at most 0° C., more in particular at most −20° C. and in particular higher than −65° C., more in particular higher than −60° C., the acrylic copolymer of the dispersed particles preferably comprises non-ionic ethylenically polyunsaturated monomers d).

The aqueous dispersion of the present invention comprises decomposition products of an oil soluble organic initiator which are obtained by free radical polymerising of the ethylenically unsaturated monomers (at least a part of the ethylenically unsaturated monomers contains (meth)acrylic moiety) in the presence of the oil-soluble organic initiator and the acrylic copolymer dispersant. The aqueous dispersion of the present invention optionally comprises non-decomposed oil-soluble organic initiator. The presence of at least a detectable amount of decomposition products of oil soluble organic initiator and optionally of oil-soluble organic initiator in the dispersions of the present invention is an indication that the dispersed acrylic copolymer particles of the aqueous dispersion are prepared by suspension polymerisation. By oil soluble is meant that the organic initiator is sufficiently soluble in the dispersed oil phase that produces the acrylic polymer to initiate suspension polymerisation. As used herein, an oil soluble initiator has a water solubility of at most 1 g per l water at 20° C. Thus tert.-butyl hydroperoxide, hydrogen peroxide, ammonium persulfate and kalium persulfate are not to be considered oil soluble initiators in the present invention. Preferred oil soluble organic initiators are substantially completely dissolvable in hexane under standard conditions. Examples of suitable oil soluble organic initiators are belonging to the classes of organic peroxide, di-azo's, peresters, polycarbonates, such as e.g. 2,2'-azobis(2,4-dimethylvaleronitrile) (ADVN), di-benzoyl peroxide (BPO), di-lauroyl peroxide (LPO), 2,2'-azobis(2-methylbutyronitrile) (AMBN) and/or 2,2'-azobis(isobutyronitrile) (AIBN), tert.-butyl-2-ethylhexanoate, tert.-amyl-2-ethylhexanoate. Most preferred example of oil soluble organic initiator for the present invention is di-lauroyl peroxide (LPO). For di-lauroyl peroxide typical decomposition products are carbon dioxide, undecane, docosane and undecyl decanoate. Typically, from 0.01 to 2 wt. %, preferably from 0.02 to 1 wt. % of oil soluble organic initiator (relative to the total amount of monomers used to prepare the acrylic copolymer(s) of the dispersed polymeric particles) is used in the free radical polymerisation process to prepare the aqueous dispersion of the present invention.

The present invention further relates to a process for preparing the aqueous dispersion as described above, the process comprising the steps of:

A. Preparing the acrylic copolymer dispersant as defined above by a process comprising the following steps:
  i) Preparing a dispersion of acrylic copolymer by emulsion polymerisation of (meth)acrylic acid in the presence of a water-soluble initiator and at least one other monomer containing at least one acrylic or methacrylic moiety to obtain a dispersion of acrylic copolymer containing carboxylic acid groups and/or carboxylate salt groups;
  ii) Preferably filtering the dispersion obtained in step i) over a 75 micron filter in order to reduce the presence of sediment;
  iii) Preparing a (partially) neutralized acrylic copolymer by neutralizing the acrylic copolymer containing carboxylic acid groups and/or carboxylate salt groups by reacting the acrylic copolymer containing carboxylic acid groups and/or carboxylate salt groups with a base preferably in a stoichiometric amount of from 0.4 to 2.0;

B. Preparing the dispersed particles of acrylic copolymer as defined in any of the preceding claims by a process comprising the following steps:
  iv) Dissolving at least a part of the (partially) neutralized acrylic copolymer in water to obtain a solution iv);
  v) Mixing ethylenically unsaturated monomers (at least a part of the ethylenically unsaturated monomers contains (meth)acrylic moiety) with oil-soluble organic initiator to obtain a solution v) of oil-soluble organic initiator;
  vi) Transfer the solution v) into the solution iv) to obtain composition vi);
  vii) Mixing the composition vi) such that the (partially) neutralized acrylic copolymer, the oil-soluble organic initiator and the ethylenically unsaturated monomers used to prepare the acrylic copolymer dispersed particles i);
  viii) Effecting free-radical polymerisation in composition vii) by increasing the temperature to from 25 to 95° C. under atmospheric pressure until polymerisation is substantially completed.

Preferably, the total amount of solids in the dispersion is from 15 wt. % to 65 wt. %, more preferably from 30 to 65 wt. %.

The present invention further relates to the use of the aqueous dispersion as described above as matting agent in an aqueous coating composition comprising a latex polymer to obtain a matt coating optionally with tactile properties or to the use of the aqueous dispersion as described above as latex for an aqueous coating composition to obtain a matt coating optionally with tactile properties. In particular in case the glass transition temperature of the dispersed particles of the acrylic copolymer is higher than 30° C., the aqueous coating composition preferably further comprises a latex polymer (second polymer as binder). A matt coating preferably has <40, more preferably <20, even more preferably <15, even more preferably <10 gloss units at 60 degrees. The aqueous coating composition may further comprise other ingredients like additives and/or auxiliaries, such as coalescents, levelling agents, waxes, thickeners, heat stabilisers, UV absorbers, antioxidants and fillers.

The present invention also relates to the use of the aqueous dispersion as described above whereby the glass transition temperature $T_g$ of the acrylic copolymer of the dispersed particles is at most 50° C., preferably at most 0° C., more preferably at most −20° C. and preferably higher than −65° C., more preferably higher than −60° C., to obtain a matt coat (in particular <40 gloss units at 60 degrees) with tactile properties when applied to a substrate or as tactile modifier in aqueous coating composition comprising a latex polymer. In this embodiment of the present invention, the density of the dispersed acrylic polymeric particles is preferably from 0.95 to 1.10 g/ml. The density is measured at 20° C. and atmospheric pressure and is measured as a weight/volume ratio, i.e. by weighing a specified volume The present invention also relates to an aqueous coating composition comprising the aqueous dispersion of the present invention. The present invention also relates to an aqueous coating composition comprising a blend of at least an aqueous first dispersion of dispersed particles of acrylic copolymer (first polymer) as described above (Dispersion A) and an aqueous second dispersion (Dispersion B) which Dispersion B comprises dispersed polymeric particles of a latex polymer (second polymer) and which Dispersion B forms a film having high gloss (>60 gloss units at 60 degrees). The latex polymer is preferably a vinyl polymer, a polyurethane, an alkyd polymer, any combination thereof or any mixture thereof. The particles of the second polymer (Dispersion B) preferably has a volume average particle size diameter (d50) of less than 1 μm (micron) and preferably at least 90% of the particles by weight of the total amount of the particles of the second polymer has a size less than 500 nm (nanometers), preferably less than 200 nm, more preferably less than 150 nm.

The aqueous coating composition of the invention as described above can be applied to a substrate to form a matt coating (in particular <40 gloss units at 60 degrees). In case the coating composition also comprises a Dispersion B as described above, the weight ratio calculated on solid polymers—of the first polymer to the second polymer is preferably from 1/99 to 30/70 (preferred 5/95 to 15/85) and the amount of dispersed acrylic polymer particles is preferably from 25 to 50 wt. %, more preferably from 25 to 45 wt. % (relative to the total amount of solids in the aqueous coating composition). Accordingly, the present invention also relates to a coating obtained by (i) applying to a substrate an aqueous coating composition as described above wherein the dispersed particles of acrylic copolymer are preferably present in an amount of from 25 to 50 wt. %, more preferably from 25 to 45 wt. % (relative to the total amount of solids in the aqueous coating composition), and (ii) drying the aqueous coating composition to obtain a matt coating.

The aqueous coating composition of the invention can also be applied to a substrate to form a coating having tactile properties. Surprisingly it has been found that control of matt values alone is generally insufficient to produce coatings having good tactile properties. Thus for example not all prior art matt coatings will necessary exhibit good tactile properties as other factors are also important. It is believed that the perception of tactility arises from a complex interaction between various surface properties such as surface friction, polymer modulus, wetness, roughness (relates to matt or gloss), warmness (e.g. as measured by thermal diffusivity) and/or hardness (e.g. as measured by Shore hardness). In this embodiment of the invention, the aqueous coating composition comprises an aqueous dispersion comprising dispersed acrylic polymer particles preferably having a density in the range from 0.95 to 1.10 g/ml; and the glass transition temperature $T_g$ of the acrylic copolymer of the dispersed particles present in the aqueous dispersion is preferably at most 50° C., more preferably at most 0° C., more preferably at most −20° C. and preferably higher than −65° C., more preferably higher than −60° C. In case the coating composition also comprises a Dispersion B as described above, the second polymer is preferably a polyurethane, where the weight ratio calculated on solid polymers—of the first polymer to the second polymer is from 10/90 to 50/50, and where the aqueous coating composition may further comprise a second latex polymer (third polymer as binder) in an amount from 0 to 30 wt. % (relative to the total amount of first, second and third polymer). The present invention further relates to a coating obtained by (i) applying to a substrate an aqueous coating composition as described above whereby the glass transition temperature $T_g$ of the acrylic copolymer of the dispersed particles is at most 50° C., preferably at most 0° C., more preferably at most −20° C. and preferably higher than −65° C., more preferably higher than −60° C., wherein the density of the dispersed acrylic polymeric particles is preferably from 0.95 to 1.10 g/ml and (ii) drying the aqueous coating composition to obtain a coating having tactile properties.

The aqueous coating composition according to the present invention may further comprise at least one further inorganic matting agent (which may be solid and/or a liquid wax) in an amount of no more than 10% by weight of the total polymer present in the composition; and
where the coating composition forms a matt (in particular <40, preferably <20, more preferably <10 gloss units at 60 degrees) coat when applied to a substrate.

The aqueous coating composition of the invention may be applied to a variety of substrates including wood, card board, metal, stone, concrete, glass, fibres, (artificial) leather, paper, plastics, foam, tissues, (laminating) films and the like, by any conventional method including brushing, dipping, flow coating, spraying, and the like. The coating composition of the invention may also be used to coat the interior and/or exterior surfaces of three-dimensional articles. The carrier medium may be removed by natural drying or accelerated drying (by applying heat) to form a coating.

The present invention further relates to the use of an acrylic copolymer having an alkaline solubility higher than 50 wt. % as dispersant to prepare a dispersion of acrylic copolymer having a volume average particle size diameter (d50) of from 1 to 50 μm (microns), preferably from 1 to 40 μm, more preferably from 1 to 30 μm, which dispersion is storage stable or semi-storage stable under standard conditions for at least one week. In a preferred embodiment, the acrylic copolymer having an alkaline solubility higher than 50 wt. % is used as dispersant to prepare a dispersion of acrylic copolymer having a volume average particle size diameter (d50) of from 2 to 25 μm, more preferably from 5 to 20 μm and even more preferably from 10 to 15 μm, which dispersion is storage stable under standard conditions for at least one week.

The present invention further relates to the use of an acrylic copolymer that is (partially) neutralized and has (a) an acid value of at least 40 mg KOH/g copolymer (determined according to ASTM D1639-90), (b) a weight average molecular weight of least 30000 Daltons (determined by triple detection gel permeation chromatography GPC using a mixture of water containing 0.15 molar NaCl and 0.08 molar tris(hydroxymethyl)aminomethane as eluent), and (c) a glass transition temperature from −50° C. to 150° C. (determined using Differential Scanning calorimetry according to ISO Standard 1357), as dispersant to prepare a dispersion of acrylic copolymer having a volume average particle size diameter (d50) of from 1 to 50 μm (microns), preferably from 1 to 40 μm, more preferably from 1 to 30 μm, which dispersion is storage stable or semi-storage stable under standard conditions for at least one week. In a preferred embodiment, the acrylic copolymer that is (partially) neutralized and has an acid value, weight average molecular weight and glass transition temperature as defined herein above is used as dispersant to prepare a dispersion of acrylic copolymer having a volume average particle size diameter (d50) of from 2 to 25 μm, more preferably from 5 to 20 μm and even more preferably from 10 to 15 μm, which dispersion is storage stable under standard conditions for at least one week.

The present invention is now illustrated by reference to the following examples. Unless otherwise specified, all parts, percentages and ratios are on a weight basis.

Test Methods Amd Measurements

Unless otherwise indicated all the tests herein are carried out under standard conditions as also defined herein.

Gloss Analysis

Gloss is determined by casting a dry film thickness coating of 15 microns on a LENETA 2C Opacity Chart and determining gloss using a BYK-Gardner micro TRI-gloss analyser. Gloss is determined according to DIN67530 and reported in gloss units under 20, 60 and 85° angles.

Abbreviations Used

DM denotes demineralised water
Disp denotes acrylic dispersant
SDT denotes sodium-di-thionite
Amm denotes ammonia (25 wt %)
TM denotes total monomers
BA denotes n-butylacrylate
EA denotes ethylacrylate
MAA denotes methacrylic acid
MMA denotes methylmethacrylate
BMA denotes n-Butylmethacrylate
St denotes styrene
DPGDA denotes di-propyleneglycol-di-acrylate
SDT denotes sodium-di-thionite
LMKT denotes dodecylmercaptane
3-MPA denotes 3-mercaptopropionic acid
SLES denotes sodiumlaurylethersulphate (30 wt %)
APS denotes sodium persulphate
LPO denotes di-lauroylperoxide
Mw denotes weight average molecular weight determined as described above.
Tg denotes glass transition temperature calculated according Flory-Fox equation or measured according to DSC as described above.
SA denotes stoichiometric amount Preparation Acrylic Copolymer Dispersants (i)

In a 2 liter glass 3-neck spherical reactor equipped with nitrogen inlet, Pt100, exhaust cooling and stirrer ingredients '1', '2' and '3' (see tables below) are loaded to the reactor. According stirrer, nitrogen purge and cooling started a reactor content heated to 82° C.

Ingredient '4' till '11' are charged to the feed vessel and stable emulsified feed prepared. Upon reaching reactor temperature of 82° C. the feed is charged to the reactor over a 90 minute period. Directly after the feed has been completed a solution of '12' in '13' is fed to the reactor in 30 minutes followed by a 30 minute 80 at 82° C. Next the obtained dispersion is cooled down and filtered over 75 micron filter. The data and results are reported in Table 1 (n.d. means not determined).

TABLE 1

Dispersant preparation

| Label | | Disp-1 | Disp-2 | Disp-3 | Disp-4 | Disp-5 | Disp-6 |
|---|---|---|---|---|---|---|---|
| '1' | DM | 797.87 | 793.19 | 793.19 | 793.19 | 793.19 | 793.19 |
| '2' | SLES | 7.22 | 7.22 | 7.22 | 7.22 | 7.22 | 7.22 |
| '3' | APS | 3.11 | 3.11 | 3.11 | 3.11 | 3.11 | 3.11 |
| '4' | BMA | 524.00 | 524.00 | — | 644.60 | 586.20 | 469.40 |
| '5' | EA | 75.00 | 75.00 | 75.00 | 75.00 | 75.00 | 75.00 |
| '6' | BA | — | — | 54.50 | — | — | — |
| '7' | MMA | — | — | 469.50 | — | — | — |
| '8' | MAA | 179.00 | 179.00 | 179.00 | 58.40 | 116.80 | 233.60 |
| '9' | LMKT | 1.56 | 6.24 | 1.56 | 1.56 | 1.56 | 1.56 |
| '10' | SLES | 44.00 | 44.00 | 44.00 | 44.00 | 44.00 | 44.00 |
| '11' | DM | 345.00 | 345.00 | 345.00 | 345.00 | 345.00 | 345.00 |
| '12' | APS | 0.24 | 0.24 | 0.24 | 0.24 | 0.24 | 0.24 |
| '13' | DM | 23.00 | 23.00 | 23.00 | 23.00 | 23.00 | 23.00 |
| Total | | 2000.00 | 2000.00 | 2000.00 | 2000.00 | 2000.00 | 2000.00 |
| Film forming | | No | No | No | Borderline | No | No |
| Solids [wt %] | | 39.6 | 40.0 | 40.2 | 40.1 | 39.8 | 39.9 |
| pH | | 2.5 | 2.5 | 2.7 | 2.4 | 2.6 | 2.6 |
| Viscosity @25° C. [mPa · s] | | 16 | 20 | 22 | 20 | 18 | 17 |
| Alkaline solubility [wt % dissolved] | | 72.1 | n.d. | 100 | 3.3 | n.d. | 88.0 |
| Tg - DSC midpoint [° C.] | | 85 | 87 | 115 | 49 | 61 | 97 |
| Mw (indication) [kDa] | | 150 | 40 | 150 | 150 | 150 | 150 |
| Acid value - Theor [mgKOH/g dispersion of disp] | | 58.4 | 58.4 | 58.4 | 19.1 | 38.1 | 76.2 |

Dispersants 1 to 6 were accordingly applied as stabilizer in a next stage water-based dispersion preparation to obtain micron sized acrylic copolymer dispersions.

The alkaline solubility of dispersants 1, 3, 4 and 6 are determined as described above.

TABLE 2

Alkaline solubility data of the various dispersants

|  | Disp. 1 | Disp. 3 | Disp. 4 | Disp. 6 |
|---|---|---|---|---|
| Prior to centrifuging |  |  |  |  |
| Appearance | Translucent | Clear | White | Hazy |
| Solids [wt %] | 2.98 | 3.02 | 3.03 | 3.01 |
| pH (intial)/pH corrected | 8.95 | 7.95/8.77 | 9.49 | 8.72 |
| After centrifuging |  |  |  |  |
| Appearance | Clear | Clear | Clear | Clear |
| Solids [wt %] of the supernatant | 2.15 | 3.02 | 0.10 | 2.65 |
| pH | 8.82 | 8.65 | 9.40 | 8.58 |
| Final alkaline solubility [%] | 72.1 | 100 | 3.3 | 88.0 |

EXAMPLES 1-6: PREPARATION MICRON SIZED ACRYLIC COPOLYMER DISPERSIONS

In a 2 liter glass 3-neck spherical reactor equipped with nitrogen inlet, Pt100, exhaust cooling and stirrer ingredients '1' and '2' (see tables below) are loaded to the reactor. Next '3' is added and reactor content heated to 60° C. Upon reaching 60° C. '4' is added to the reactor and content heated to 80-85° C. This temperature is maintained for 30 minutes to allow dispersant to dissolve.

Next reactor content is cooled to room temperature.

Ingredients '5', '6' and '7' are loaded to a feed tank and mixed till '7' is completely dissolved.

Accordingly monomer feed tank content is at a set stirrer speed transferred to the reactor over a 45-60 minute period. After monomer has been transferred, feed vessel is rinsed with '8' and dispersing hold at set agitator speed is maintained for a 30-minute period. Next reactor is heated to 40° C. and solution of '9' in '10' added to the reactor. This will trigger the polymerisation to start and temperature will rise to 70-90° C. After peak temperature has been obtained temperature is levelled at 80° C. for 60 minutes. After this hold, a solution of '11' in '12' is added to the reactor and 80° C. maintained for another 60 minutes. Next the final dispersion is cooled, unloaded and specified and the gloss of the coating is determined.

In order to benefit from the dispersant activity of the acrylic copolymer dispersant prepared it was investigated how neutralization degree impacted processing and particle size control. To study this the neutralization degree was altered by changing the ammonia level (3' and '4') applied.

Data and results are reported in below table.

TABLE 3

Impact dispersant neutralisation on dispersion characteristics

| Label |  | Ex-1 | Ex-2 | Ex-3 | Ex-4 | Ex-5 | Ex-6 |
|---|---|---|---|---|---|---|---|
| '1' | DM | 455.92 | 455.92 | 455.92 | 455.92 | 455.92 | 455.92 |
| '2' | Disp-1 | 239.96 | 239.96 | 239.96 | 239.96 | 239.96 | 239.96 |
| '3' | Amm | 4.23 | 6.34 | 8.44 | 10.91 | 13.09 | 15.27 |
| '4' | Amm | 4.23 | 6.34 | 8.44 | 10.91 | 13.09 | 15.27 |
| '5' | BA | 345.54 | 345.54 | 345.54 | 345.54 | 345.54 | 345.54 |
| '6' | DPGDA | 38.39 | 38.39 | 38.39 | 38.39 | 38.39 | 38.39 |
| '7' | LPO | 2.88 | 2.88 | 2.88 | 2.88 | 2.88 | 2.88 |
| '8' | DM | 60.65 | 56.73 | 52.53 | 47.59 | 43.23 | 38.87 |
| '9' | SDT | 0.96 | 0.96 | 0.96 | 0.96 | 0.96 | 0.96 |
| '10' | DM | 59.99 | 59.99 | 59.99 | 59.99 | 59.99 | 59.99 |
| '11' | APS | 0.96 | 0.96 | 0.96 | 0.96 | 0.96 | 0.96 |
| '12' | DM | 35.99 | 35.99 | 35.99 | 35.99 | 35.99 | 35.99 |
| Total |  | 1250.00 | 1250.00 | 1250.00 | 1250.00 | 1250.00 | 1250.00 |
| Agitator speed [rpm] |  | 450 | 450 | 450 | 450 | 450 | 450 |
| Neutralisation degree [SA] |  | 0.5 | 0.75 | 1.00 | 1.25 | 1.50 | 1.75 |
| Dispersant on TM [wt %] |  | 25.0 | 25.0 | 25.0 | 25.0 | 25.0 | 25.0 |
| Tg calculated [° C.] |  | −38 | −38 | −38 | −38 | −38 | −38 |
| Acid value - theor [mgKOH/g] |  | 11.2 | 11.2 | 11.2 | 11.2 | 11.2 | 11.2 |
| Appearance |  | White dispersion | White dispersion | White dispersion | White dispersion | White dispersion | White dispersion |
| Storage stability |  | Good | Good | Good | Good | Good | Good |
| Solids [wt %] |  | 37.8 | 38.5 | 38.3 | 38.4 | 38.2 | 38.5 |
| pH |  | 7.0 | 7.3 | 7.7 | 8.1 | 8.4 | 8.7 |
| Viscosity @25° C. [mPa · s] |  | 173 | 380 | 190 | 3620 | 41000 | 52000 |
| d 50 [microns] |  | 20.9 | 7.9 | 3.8 | 2.7 | 2.9 | 2.7 |
| Span (d 90-d 10)/d 50 |  | 12.3 | 2.9 | 1.7 | 1.5 | 5.6 | 7.2 |
| 15 µm dry film LENETA chart |  |  |  |  |  |  |  |
| Gloss @20° [GU] |  | 0.5 | 0.2 | 0.3 | 1.2 | 1.7 | 1.7 |
| Gloss @60° [GU] |  | 5.0 | 2.8 | 3.4 | 10.7 | 13.9 | 15.6 |
| Gloss @85° [GU] |  | 6.4 | 8.7 | 25.1 | 53.0 | 28.6 | 40.1 |

EXAMPLES 7-10 AND COMPARATIVE EXPERIMENTS A-B

Example 3 was repeated but with dispersants 2-6 as described above which were neutralized with a neutralization degree of 1.0 SA. These dispersants were evaluated on stabilisation performance and final particle size characteristics. Data and results are reported in below table.

TABLE 4

Effect of dispersant modifications on final low Tg polymer dispersion characteristics

| Label | | Ex-7 | Ex-8 | Ex-9 | Comp Ex A | Comp Ex B | Ex-10 |
|---|---|---|---|---|---|---|---|
| '1' | DM | 455.92 | 455.92 | 455.92 | 455.92 | 455.92 | 455.92 |
| '2' | Disp-1 | 239.96 | — | — | — | — | — |
| | Disp-2 | — | 239.96 | — | — | — | — |
| | Disp-3 | — | — | 239.96 | — | — | — |
| | Disp-4 | — | — | — | 239.96 | — | — |
| | Disp-5 | — | — | — | — | 239.96 | — |
| | Disp-6 | — | — | — | — | — | 239.96 |
| '3' | Amm | 8.44 | 8.44 | 8.44 | 8.44 | 8.44 | 8.44 |
| '4' | Amm | 8.44 | 8.44 | 8.44 | 8.44 | 8.44 | 8.44 |
| '5' | BA | 345.54 | 345.54 | 345.54 | 345.54 | 345.54 | 345.54 |
| '6' | DPGDA | 38.39 | 38.39 | 38.39 | 38.39 | 38.39 | 38.39 |
| '7' | LPO | 2.88 | 2.88 | 2.88 | 2.88 | 2.88 | 2.88 |
| '8' | DM | 52.53 | 52.53 | 52.53 | 52.53 | 52.53 | 52.53 |
| '9' | SDT | 0.96 | 0.96 | 0.96 | 0.96 | 0.96 | 0.96 |
| '10' | DM | 59.99 | 59.99 | 59.99 | 59.99 | 59.99 | 59.99 |
| '11' | APS | 0.96 | 0.96 | 0.96 | 0.96 | 0.96 | 0.96 |
| '12' | DM | 35.99 | 35.99 | 35.99 | 35.99 | 35.99 | 35.99 |
| Total | | 1250.00 | 1250.00 | 1250.00 | 1250.00 | 1250.00 | 1250.00 |
| Agitator speed [rpm] | | 450 | 350 | 350 | 350 | 350 | 650 |
| Dispersant on TM [wt %] | | 25.0 | 25.0 | 25.0 | 25.0 | 25.0 | 25.0 |
| Tg polymer calculated [° C.] | | −38 | −38 | −38 | −38 | −38 | −38 |
| Tg dispersant - DSC [° C.] | | 85 | 87 | 115 | 49 | 61 | 97 |
| Acid value - theor [mgKOH/g] | | 11.2 | 11.2 | 11.2 | 3.7 | 7.3 | 14.6 |
| Appearance | | White dispersion | White dispersion | White dispersion | Beads formed | Flocculates upon processing | White dispersion |
| Storage stability | | Good | Good | Good | xxx | xxx | Good |
| Solids [wt %] | | 38.3 | 34.8 | 32.3 | xxx | xxx | 31.0 |
| pH | | 7.7 | 8.7 | 7.7 | xxx | xxx | 8.0 |
| Viscosity @25° C. [mPa · s] | | 190 | 33 | 580 | xxx | xxx | 935 |
| d 50 [microns] | | 3.8 | 6.2 | 1.0 | 113 | xxx | 2.1 |
| Span (d 90-d 10)/d 50 | | 1.7 | 7.9 | 1.1 | 1.4 | xxx | 2.3 |
| 15 μm dry film LENETA chart | | | | | | | |
| Gloss @20° [GU] | | 0.3 | 0.4 | 0.6 | xxx | xxx | 0.7 |
| Gloss @60° [GU] | | 3.4 | 3.9 | 13.9 | xxx | xxx | 7.6 |
| Gloss @85° [GU] | | 24.9 | 14.6 | 76.7 | xxx | xxx | 39.9 |

COMPARATIVE EXPERIMENTS C AND D

The effect of the hydrophilicity of the applied free radical initiator was studied using ammonium persulphate (APS) and tert-butyl hydroperoxide (t-BHPO) as free radical initiators. The data and results are reported in Table 5.

TABLE 5

| Label | | Comp Ex-C | Comp Ex-D |
|---|---|---|---|
| '1' | DM | 373.73 | 372.85 |
| '2' | Disp-1 | 173.27 | 173.27 |
| '3' | Amm | 8.19 | 8.19 |
| '4' | Amm | 8.19 | 8.19 |
| '5' | BA | 249.51 | 249.51 |
| '6' | DPGDA | 27.72 | 27.72 |
| '7a' | APS | 2.08 | — |
| '7b' | t-BHPO (70%) | — | 2.96 |
| '7c' | t-BPEH | — | — |
| '7d' | MBPO (72.5%) | — | — |
| '7e' | AMBN | — | — |
| '8' | DM | 86.63 | 86.63 |
| '9' | SDT | 0.69 | 0.69 |
| '10' | DM | 43.32 | 43.32 |
| '11' | APS | 0.69 | 0.69 |
| '12' | DM | 25.99 | 25.99 |
| Total | | 1000.00 | 1000.00 |
| Agitator speed [rpm] | | 350 | 350 |
| Dispersant on TM [wt %] | | 25.0 | 25.0 |
| Tg calculated [° C.] | | −38 | −38 |
| Appearance | | Coagulated upon processing | Coagulated upon processing |
| d50 [μm] | | | |
| Span (d90-d10)/d50 | | | |
| pH | | | |
| Storage stability | | | |
| Solids [wt %] | | | |
| Viscosity [mPa · s] | | | |
| 15 μm dry film LENETA chart | | | |
| Gloss @20° [GU] | | | |
| Gloss @60° [GU] | | | |
| Gloss @85° [GU] | | | |

From the results, it is clear that APS and t-BHPO have a negative impact on dispersion stability.

EXAMPLES 11-15

The acrylic copolymeric dispersant 1 is used in different amounts and for different polymer composition. Data and results are reported in Table 6. As can be seen, the polymeric dispersant concentration applied allows particle size to be altered/controlled.

TABLE 6

| Label | | Ex-11 | Ex-12 | Ex-13 | Ex-14 | Ex-15 |
|---|---|---|---|---|---|---|
| '1' | DM | 585.86 | 639.90 | 585.86 | 431.02 | 573.72 |
| '2' | Disp-1 | 201.52 | 151.14 | 201.52 | 171.72 | 151.14 |
| '3' | Amm | 7.33 | 5.49 | 7.33 | 6.23 | 5.50 |
| '4' | Amm | 7.33 | 5.49 | 7.33 | 6.23 | 5.50 |
| '5a' | MMA | 322.43 | 322.43 | — | — | — |
| '5b' | BMA | — | — | 290.18 | 329.01 | 290.19 |
| '6' | DPGDA | — | — | 32.24 | 36.55 | 32.24 |
| '7' | LPO | 2.42 | 2.42 | 2.42 | 1.83 | 2.42 |
| '8' | DM | 41.51 | 41.51 | 41.51 | 247.01 | 148.19 |
| '9' | APS | 0.81 | 0.81 | 0.81 | 0.92 | 0.81 |
| '10' | DM | 80.79 | 80.79 | 80.79 | 17.47 | 40.30 |
| Total | | 1250.00 | 1250.00 | 1250.00 | 1250.00 | 1250.00 |
| Agitator speed [rpm] | | 350 | 300 | 350 | 250 | 250 |
| Dispersant on TM [wt %] | | 25.0 | 18.75 | 25.0 | 15.8 | 15.8 |
| Tg calculated [° C.] | | 105 | 105 | 28 | 28 | 28 |
| Appearance | | White dispersion | White dispersion | White dispersion | White dispersion | White dispersion |
| Storage stability | | Good | Good | Good | Good | Good |
| d 50 [μm] | | 9.2 | 20.7 | 12.1 | 17.7 | 33.0 |
| Span (d 90-d 10)/d 50 | | 2.1 | 2.1 | 1.9 | 1.8 | 1.8 |
| pH | | 7.9 | 8.2 | 8.0 | 8.4 | 8.4 |
| Solids [wt %] | | 32.5 | 30.0 | 32.1 | 34.2 | 30.6 |
| Viscosity [mPa · s] | | 850 | 300 | 90 | 50 | 25 |
| 15 μm dry film LENETA chart | | | | | | |
| Gloss @20° [GU] | | 2.4 | 1.3 | 0.3 | 1.4 | 1.3 |
| Gloss @60° [GU] | | 7.6 | 3.8 | 2.3 | 3.2 | 3.6 |
| Gloss @85° [GU] | | 2.4 | 0.8 | 1.9 | 1.3 | 1.8 |

Results clearly shows the impact of the dispersant concentration on particle size. The dispersant is universal in the sense that similar particle size trends can be obtained with different polymeric phase compositions.

The invention claimed is:

1. An aqueous dispersion comprising:
   (i) dispersed particles of an acrylic copolymer having a volume average particle size diameter (d50) of from 1 to 50 μm (microns),
   (ii) from 10 to 35% by weight, relative to the total amount of monomers used to prepare the acrylic copolymer of the dispersed polymeric particles, of an acrylic copolymer dispersant having an alkaline solubility higher than 50 wt. %, and
   (iii) decomposition products of an oil-soluble organic initiator.

2. The aqueous dispersion according to claim 1, wherein the acrylic copolymer dispersant is at least partially neutralized and has:
   (a) an acid value of at least 40 mg KOH/g dispersion of acrylic copolymer dispersant,
   (b) a weight average molecular weight of at least 30000 Daltons, and
   (c) a glass transition temperature from −50° C.

3. The aqueous dispersion as claimed in claim 1, wherein the alkaline solubility of the acrylic copolymer dispersant is higher than 70 wt. %.

4. The aqueous dispersion as claimed in claim 1, wherein the alkaline solubility of the acrylic copolymer dispersant is in a range which is higher than 50 wt. % and at most 90 wt. %.

5. The aqueous dispersion as claimed in claim 1, wherein the acid value of the dispersion of the acrylic copolymer dispersant is at least 50 mg KOH/g dispersion of acrylic copolymer dispersant and at most 100 mg KOH/g dispersion of acrylic copolymer dispersant.

6. The aqueous dispersion as claimed in claim 1, wherein the weight average molecular weight of the acrylic copolymer dispersant is at least 50000 Daltons and at most 1000000 Daltons.

7. The aqueous dispersion as claimed in claim 1, wherein the acrylic copolymer dispersant has a neutralization degree which is in a stoichiometric range from 80 to 120%.

8. The aqueous dispersion as claimed in claim 1, wherein the dispersion is storage-stable or semi-storage stable under standard conditions of relative humidity of 70% (±5%), ambient temperature of 23° C. (±2°), atmospheric pressure and an air flow of less than or equal to 0.1 m/s.

9. The aqueous dispersion as claimed in claim 1, wherein the amount of acrylic copolymer dispersant is at least 15% by weight, relative to the total amount of monomers used to prepare the acrylic copolymer of the dispersed polymeric particles.

10. The aqueous dispersion as claimed in claim 1, wherein the dispersed acrylic copolymer particles have a volume average particle size diameter (d50) of from 1 to 40 μm.

11. The aqueous dispersion as claimed in claim 1, wherein the dispersed acrylic copolymer particles have a volume average particle size diameter (d50) of from 2 to 25 μm.

12. The aqueous dispersion as claimed in claim 1, wherein the dispersed acrylic copolymer particles have a particle size distribution ((d90−d10)/d50) of at most 3.

13. The aqueous dispersion as claimed in claim 1, wherein the acrylic copolymer of the dispersed acrylic copolymer particles has a glass transition temperature Tg which is in a range from −50 to 150° C.

14. The aqueous dispersion as claimed in claim 1, wherein the acrylic copolymer of the acrylic copolymer dispersed particles comprises:
   a) from 0 to 10 wt. % of potentially ionic ethylenically mono-unsaturated monomers;
   b) from 0 to 10 wt. % of non-ionic ethylenically unsaturated monomers with a functional group for crosslinking;
   c) from 60 to 100 wt. % of non-ionic ethylenically mono-unsaturated monomers other than the monomers b);
   d) from 0 to 20 wt % of non-ionic ethylenically polyunsaturated monomer other than the monomers b); wherein
   the amount of the monomers of a) to d) sum to 100 wt. % and are relative to the total weight amount of the monomers to prepare the acrylic copolymer.

15. The aqueous dispersion as claimed in claim 14, wherein the non-ionic ethylenically mono-unsaturated monomers c) are selected from the group consisting of acrylonitrile, acrylates, methacrylates, itaconates, acrylamides, arylalkylenes and mixtures thereof.

16. The aqueous dispersion as claimed in claim 1, wherein the acrylic copolymer dispersant comprises:
   A) a (meth)acrylic acid monomer; and
   B) at least one monomer containing at least one acrylic or methacrylic moiety which is different than the (meth) acrylic acid monomer A).

17. The aqueous dispersion as claimed in claim 1, wherein the aqueous dispersion is a free-radical polymerisation product of ethylenically unsaturated monomers in the presence of the oil-soluble organic initiator and the acrylic copolymer dispersant.

18. The aqueous dispersion as claimed in claim 1, wherein the aqueous dispersion is free of non-aqueous solvent.

19. The aqueous dispersion as claimed in claim 1, wherein the dispersed acrylic copolymer particles have a density which is in a range from 0.95 to 1.10 g/ml.

20. The aqueous dispersion as claimed in claim 1, wherein the dispersion comprises solids in an amount from 30 to 65 wt. %.

21. A process for preparing the aqueous dispersion as claimed in claim 1, the process comprising the steps of:
   (A) preparing the acrylic copolymer dispersant by a process comprising the following steps:
      (A1) preparing a dispersion of acrylic copolymer by emulsion polymerisation of (meth)acrylic acid and at least one other monomer containing at least one acrylic or methacrylic moiety to obtain a dispersion of acrylic copolymer containing carboxylic acid groups and/or carboxylate salt groups;
      (A2) optionally filtering the dispersion obtained in step i) over a 75 micron filter in order to reduce the presence of sediment; and
      (A3) preparing an at least partially neutralized acrylic copolymer by neutralizing the acrylic copolymer containing carboxylic acid groups and/or carboxylate salt groups by reacting the acrylic copolymer containing carboxylic acid groups and/or carboxylate salt groups with a base in a stoichiometric amount of from 0.4 to 2.0; and
   (B) preparing the dispersed particles of acrylic copolymer by a process comprising the following steps:
      (B1) dissolving at least a part of the at least partially neutralized acrylic copolymer in water to obtain an at least partially neutralized acrylic copolymer solution (1);
      (B2) mixing ethylenically unsaturated monomers, wherein at least a part of the ethylenically unsaturated monomers contains a (meth)acrylic moiety, with an oil-soluble organic initiator to obtain an oil-soluble organic initiator solution (2) containing the ethylenically unsaturated monomers;
      (B3) transferring the solution (2) into the solution (1) to obtain a precursor composition;
      (B4) mixing the precursor composition of step (B3) to obtain a mixed composition; and
      (B5) conducting free-radical polymerisation of the mixed composition by increasing temperature of the mixed composition from 25 to 95° C. under atmospheric pressure until the dispersion contains 15 wt. % to about 65 wt. % solids.

22. An aqueous coating composition comprising the aqueous dispersion according to claim 1.

23. An aqueous coating composition comprising a blend of:
   (A) an aqueous first dispersion comprised of the aqueous dispersion according to claim 1; and
   (B) an aqueous second dispersion comprising dispersed polymeric particles of a latex polymer, wherein
   the polymeric particles of the latex polymer of the aqueous second dispersion have a volume average particle size diameter (d50) of less than 1 μm (micron) and
   wherein at least 90% of the polymer particles of the latex polymer of the second aqueous second dispersion, by weight of the total amount of the polymeric particles of the latex polymer, have a size less than 500 nm.

24. The aqueous coating composition as claimed in claim 23, wherein the second polymer is a vinyl polymer, a polyurethane, an alkyd polymer or a combination or mixture thereof.

25. The aqueous coating composition according to claim 23, wherein the aqueous second forms a film having a high gloss of greater than 60 gloss units at 60 degrees, and wherein
   (i) the weight ratio as calculated based on solid polymers, of the acrylic copolymer of the first dispersion to the latex polymer of the second dispersion is from 1/99 to 30/70; and
   (ii) the aqueous coating composition forms a matt coating exhibiting less than 40 gloss units at 60 degrees when applied to a substrate.

26. A method of forming a coated substrate comprising:
   (i) applying the aqueous coating composition according to claim 22 to a substrate; and
   (ii) drying the aqueous coating composition to obtain a matt coating, wherein the substrate is selected from the group consisting of natural leather, artificial leather, paper, foil, cardboard, wood, metal, concrete, fibres, tissues, plastic, and films.

* * * * *